(12) United States Patent
Mohara et al.

(10) Patent No.: US 10,414,944 B2
(45) Date of Patent: Sep. 17, 2019

(54) ANTIFOULING ARTICLE

(71) Applicant: DAIKIN INDUSTRIES, LTD., Osaka-shi, Osaka (JP)

(72) Inventors: Kensuke Mohara, Settsu (JP); Hisashi Mitsuhashi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 225 days.

(21) Appl. No.: 15/508,408

(22) PCT Filed: Aug. 31, 2015

(86) PCT No.: PCT/JP2015/074750
§ 371 (c)(1),
(2) Date: Mar. 2, 2017

(87) PCT Pub. No.: WO2016/035765
PCT Pub. Date: Mar. 10, 2016

(65) Prior Publication Data
US 2017/0283648 A1    Oct. 5, 2017

(30) Foreign Application Priority Data
Sep. 3, 2014 (JP) ................... 2014-179511

(51) Int. Cl.
| C09D 171/00 | (2006.01) |
| C09D 171/02 | (2006.01) |
| B32B 9/00 | (2006.01) |
| B32B 27/30 | (2006.01) |
| G02B 1/14 | (2015.01) |
| C09D 5/00 | (2006.01) |

(52) U.S. Cl.
CPC .............. *C09D 171/00* (2013.01); *B32B 9/00* (2013.01); *B32B 27/30* (2013.01); *C09D 5/00* (2013.01); *C09D 171/02* (2013.01); *G02B 1/14* (2015.01)

(58) Field of Classification Search
USPC ........................................ 428/408
See application file for complete search history.

(56) References Cited

U.S. PATENT DOCUMENTS

| 5,536,425 A | * | 7/1996 | Kondo | ............. C08G 65/33303 252/62.51 R |
| 6,183,872 B1 | | 2/2001 | Tanaka et al. | |
| 6,645,634 B1 | | 11/2003 | Shirai et al. | |
| 2004/0213951 A1 | * | 10/2004 | Shimokawa | ......... C10M 107/38 428/65.8 |
| 2006/0052262 A1 | * | 3/2006 | Akada | .................. C08G 65/007 508/556 |
| 2007/0264531 A1 | | 11/2007 | Machida et al. | |
| 2008/0138605 A1 | | 6/2008 | Takagi | |
| 2009/0208728 A1 | | 8/2009 | Itami et al. | |
| 2010/0304186 A1 | * | 12/2010 | Shimokawa | ......... C10M 107/38 428/833 |
| 2011/0256425 A1 | * | 10/2011 | Kasai | ..................... G11B 5/725 428/833.3 |
| 2014/0120350 A1 | | 5/2014 | Kitsu et al. | |

FOREIGN PATENT DOCUMENTS

| EP | 0643125 | * | 3/1993 |
| JP | 07-320255 | * | 12/1995 |
| JP | 7-326042 A | | 12/1995 |
| JP | 2001-006155 A | | 1/2001 |
| JP | 2005-146060 A | | 6/2005 |
| JP | 2008-150275 A | | 7/2008 |
| JP | 2008-534696 A | | 8/2008 |
| JP | 2009-301799 A | | 12/2009 |
| WO | 97/007155 A1 | | 2/1997 |
| WO | 2012/169540 A1 | | 12/2012 |

OTHER PUBLICATIONS

Walter Navarrini, et al., "Low surface energy coatings covalently bonded on diamond-like carbon films", Diamond & Related Materials, Jan. 13, 2010, pp. 336-341, vol. 19.

International Search Report for PCT/JP2015/074750 dated Nov. 24, 2015 [PCT/ISA/210].

International Preliminary Report on Patentability with translation of Written Opinion dated Mar. 7, 2017, issued by the International Searching Authority in application No. PCT/JP2015/074750.

Communication dated Apr. 13, 2018 from the European Patent Office in counterpart European application No. 15837667.3.

* cited by examiner

*Primary Examiner* — Archene A Turner

(74) *Attorney, Agent, or Firm* — Sughrue Mion, PLLC

(57) ABSTRACT

The present invention provides a novel antifouling article comprising a base material, a diamond-like carbon layer and an antifouling coating layer which is formed on the diamond-like carbon layer from a surface treating agent comprising a perfluoropolyether group-containing compound and having high acid resistant and alkaline resistant.

17 Claims, No Drawings

ANTIFOULING ARTICLE

CROSS REFERENCE TO RELATED APPLICATIONS

This application is a National Stage of International Application No. PCT/JP2015/074750 filed Aug. 31, 2015, claiming priority based on Japanese Patent Application No. 2014-179511 filed Sep. 3, 2014, the contents of all of which are incorporated herein by reference in their entirety.

TECHNICAL FIELD

The present invention relates to an antifouling article, more specifically an antifouling article comprising a base material, a diamond-like carbon layer, and an antifouling coating layer formed by a surface treating agent a fluorine-containing compound.

BACKGROUND ART

A certain fluorine-containing silane compound is known to be able to provide excellent water-repellency, oil-repellency, antifouling property, or the like when it is applied to a surface treatment of a base material. A layer (hereinafter, referred to as a "surface-treating layer") formed from a surface-treating agent comprising a fluorine-containing compound is applied to various base materials such as a glass, a plastic, a fiber and a building material as a so-called functional thin film.

As such fluorine-containing silane compound, a perfluoropolyether group containing silane compound which has a perfluoropolyether group in its molecular main chain and a hydrolyzable group bonding to a Si atom at its molecular terminal or terminal portion is known (see Patent Documents 1 and 2). When the surface-treating agent comprising the perfluoropolyether group containing silane compound is applied to a base material, a reaction of the hydrolyzable group bonding to a Si atom between the compound and the base material and between the compounds is occurred to form the surface-treating layer.

PRIOR ART DOCUMENT

Patent Document

Patent Document 1: JP 2008-534696 A
Patent Document 2: International Publication No. 97/07155

SUMMARY OF THE INVENTION

Problem to be Solved by the Invention

However, the inventors found that since the surface-treating layer as described above is bound to the base material by —Si—O—Si— bonds, there is a problem that the bond may be cleaved by hydrolysis reaction and the durability may be decreased under an acid environment or an alkaline environment, in particular under an alkaline environment. The problem may become a serious problem when the surface treating layer is used in an article likely to be exposed in the acid environment and the alkaline environment, for example an article which human perspiration can contact (for example, a touch panel, or the like).

Therefore, an object of the present invention is to provide a novel antifouling article comprising the surface-treating layer having higher acid and alkaline resistant.

Means to Solve the Problem

As a result of intensively studying, the inventors of the present invention have found that the surface-treating layer having high acid and alkaline resistant can be formed by forming a diamond-like carbon layer on a base material and forming the surface-treating layer on the diamond-like carbon layer from a fluorine-containing compound having a given group.

According to first aspect of the present invention, there is provided an antifouling article comprising a base material, a diamond-like carbon layer and an antifouling coating layer which is formed on the diamond-like carbon layer from a surface treating agent comprising a perfluoropolyether group-containing compound or a perfluoroalkyl group-containing compound.

Preferably, there is provided the antifouling article comprising a base material, a diamond-like carbon layer and an antifouling coating layer which is formed on the diamond-like carbon layer from a surface treating agent comprising one or more fluorine-containing compounds of any of formulae (A1), (A2), (B1) and (B2):

wherein:
A is each independently at each occurrence —OH, —SH, —COOH, —COSH, —CONH$_2$, —P(O)(OH)$_2$, —OP(O)(OH)$_2$, —NR$^1{}_2$,

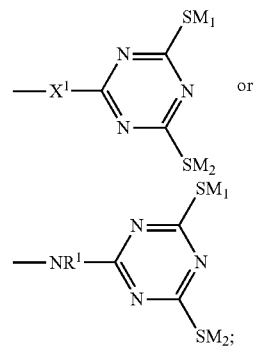

R$^1$ is each independently a hydrogen atom or a lower alkyl group;
X$^1$ is O or S;
M$_1$ and M$_2$ are each independently a hydrogen atom or an alkali metal;
Y is each independently at each occurrence a single bond or a divalent organic group;
Rf is each independently an alkyl group having 1-16 carbon atoms which may be substituted by one or more fluorine atoms;
PFPE is each independently —(OC$_4$F$_8$)$_a$—(OC$_3$F$_6$)$_b$—(OC$_2$F$_4$)$_c$—(OCF$_2$)$_d$—, wherein a, b, c and d are each independently an integer of 0 or more and 200 or less, the sum of a, b, c and d is 1 or more, and the occurrence order of the respective repeating units in parentheses with the subscript a, b, c or d is not limited in the formula;

$X^3$ is each independently a single bond or a 2-10 valent organic group;

α is each independently an integer of 1-9;

α' is each independently an integer of 1-9;

$X^6$ is each independently a single bond or a 2-10 valent organic group;

β is each independently an integer of 1-9;

β' is each independently an integer of 1-9;

$R^{91}$ is a fluorine atom, $-CHF_2$ or $-CF_3$; and Rf is a perfluoroalkylene group having 1-20 carbon atoms.

Effect of the Invention

According to the present invention, there can be provided an antifouling article having an antifouling coating layer having high acid and alkaline resistant on a base material.

Embodiments to Carry Out the Invention

Hereinafter, the antifouling article of the present invention will be described.

The antifouling article of the present invention comprises a base material, a diamond-like carbon layer, and an antifouling coating layer.

The base material usable in the present invention is not particularly limited, and may be composed of any suitable material such as an inorganic material (for example, a glass, sapphire glass), a resin (a natural or synthetic resin such as a common plastic material, specifically an acrylic resin, a polycarbonate resin, or the like), a metal (a simple substance of a metal such as aluminum, copper, or iron, or a complex such as alloy or the like), a ceramic, a semiconductor (silicon, germanium, or the like), a fiber (a fabric, a nonwoven fabric, or the like), a fur, a leather, a wood, a pottery, a stone, an architectural member or the like.

The preferable base material may be a glass or a sapphire glass. As the glass, a soda-lime glass, an alkali aluminosilicate glass, a borosilicate glass, a non-alkaline glass, a crystal glass, a quartz glass is preferable, a chemically strengthened soda-lime glass, a chemically strengthened alkali aluminosilicate glass, and a chemically strengthened borosilicate glass are more preferable.

The shape of the base material is not specifically limited. The region of the surface of the base material on which the antifouling coating layer should be formed may be at least a part of the surface of the base material, and may be appropriately determined depending on use, the specific specification, and the like of the article to be produced.

Any layer (or film) may be formed on the surface (for example, outermost layer) of the base material. For example, a hard coating layer or an antireflection layer may be formed. As the antireflection layer, either a single antireflection layer or a multi antireflection layer may be used. Examples of an inorganic material usable in the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, $WO_3$, and the like. These inorganic materials may be used alone or in combination with two or more (for example, as a mixture). When multi antireflection layer is formed, preferably, $SiO_2$ and/or SiO are used in the outermost layer. When an article to be produced is an optical member for a touch panel, it may have a transparent electrode, for example, a thin layer comprising indium tin oxide (ITO), indium zinc oxide, or the like on a part of the surface of the base material (glass or sapphire glass). Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The diamond-like carbon layer is located over the base material. The diamond-like carbon layer may be formed directly on the base material, or may be formed via the other layer described above, for example the hard coating layer or the antireflection layer.

In the present invention, the diamond-like carbon means a carbon having an amorphous structure in which both diamond bonds (bond between carbon atoms by $sp^3$ hybridized orbital) and graphite bonds (bond between carbon atoms by $sp^2$ hybridized orbital) are present. In addition, the diamond-like carbon may comprise an atom other than a carbon atom, for example hydrogen, oxygen, silicon, nitrogen, aluminum, boron, phosphorus or the like.

A thickness of the diamond-like carbon layer is not particularly limited, but may be for example, 1 nm to 100 μm, preferably 1 nm to 1000 nm, more preferably 1 nm to 100 nm.

The diamond-like carbon layer can be formed, for example, by a chemical vapor deposition (CVD) method such as a thermal CVD method, a plasma CVD method or a physical vapor deposition (PVD) method such as a vacuum evaporation method, a sputtering method or the like.

The diamond-like carbon layer has a binding ability to a fluorine-containing compound described below contained in the surface treating agent, and increase hardness and friction durability of the article.

The antifouling coating layer is formed on the diamond-like carbon layer by using a surface treating agent comprising the fluorine-containing compound, for example, a perfluoropolyether group containing compound or a perfluoroalkyl group containing compound.

The fluorine-containing compound is one or more compounds of any of formulae (A1), (A2), (B1) and (B2):

  (A1)

  (A2)

  (B1)

  (B2)

Hereinafter, the formulae (A1), (A2), (B1) and (B2) will be described.

The "2-10 valent organic group" as used herein represents a 2-10 valent group containing a carbon atom. Examples of the 2-10 valent organic group include, but are not particularly limited to, a 2-10 valent group obtained by removing 2-9 hydrogen atoms from a hydrocarbon group. For example, examples of the 2-10 valent organic group include, but are not particularly limited to, a divalent group obtained by removing one hydrogen atom from a hydrocarbon group from a hydrocarbon group.

The "hydrocarbon group" as used herein represents a group containing a carbon atom and a hydrogen atom. Examples of the hydrocarbon group include, but are not particularly limited to, a hydrocarbon group having 1-20 carbon atoms which may be substituted by one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

Examples of the substituent of the "hydrocarbon group" as used herein include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-40}$ unsaturated cycloalkyl group, a 5-10 membered heterocyclyl group, a 5-10 membered unsaturated heterocyclyl group, a $C_{6-40}$ aryl group, a 5-10 membered heteroaryl group, and the like, which may be substituted by one or more halogen atoms.

Formulae (A1) and (A2):

(Rf-PFPE)$_\alpha$-X$^3$—(Y-A)$_\alpha$            (A1)

(A-Y)$_\alpha$—X$^3$-PFPE-X$^3$—(Y-A)$_\alpha$            (A2)

In the above formula, A is each independently at each occurrence —OH, —SH, —COOH, —COSH, —CONH$_2$, —P(O)(OH)$_2$, —OP(O)(OH)$_2$, —NR$^1{}_2$,

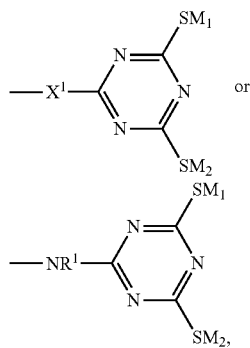

preferably, —SH, —P(O)(OH)$_2$, —OP(O)(OH)$_2$, —NR$^1{}_2$, or

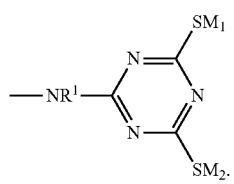

R$^1$ is each independently a hydrogen atom or a lower alkyl group. The lower alkyl group is preferably an alkyl group having 1-20 carbon atoms, more preferably an alkyl group having 1-6 carbon atoms, further preferably an alkyl group having 1-3 carbon atoms.

X$^1$ is each independently O or S.

M$_1$ and M$_2$ are each independently a hydrogen atom or an alkali metal. The alkali metal is preferably, for example, Li, Na, K or the like.

Y is each independently at each occurrence a single bond or a divalent organic group. Preferably, Y may be a single bond or a hydrocarbon (preferably a $C_{1-6}$ alkyl group which may be substituted).

In the above formula, Rf is an alkyl group having 1-16 carbon atoms which may be substituted by one or more fluorine atoms.

The "alkyl group having 1-16 carbon atoms" in the alkyl group having 1-16 carbon atoms which may be substituted by one or more fluorine atoms may be straight or branched, preferably a straight or branched alkyl group having 1-6 carbon atoms, particularly 1-3 carbon atoms, further preferably a straight alkyl group having 1-3 carbon atoms.

Rf is preferably an alkyl having 1-16 carbon atoms substituted by one or more fluorine atoms, more preferably a CF$_2$H—C$_{1-15}$ perfluoroalkylene group, more preferably a perfluoroalkyl group having 1-16 carbon atoms.

The perfluoroalkyl group having 1-16 carbon atoms may be straight or branched, and preferably is a straight or branched perfluoroalkyl group having 1-6 carbon atoms, in particular 1-3 carbon atoms, more preferably a straight perfluoroalkyl group having 1-3 carbon atoms, specifically —CF$_3$, —CF$_2$CF$_3$ or —CF$_2$CF$_2$CF$_3$.

In the formula, PFPE is —(OC$_4$F$_8$)$_a$—(OC$_3$F$_6$)$_b$—(OC$_2$F$_4$)$_c$—(OCF$_2$)$_d$—, and corresponds to a perfluoro(poly)ether group. Here, a, b, c and d are each independently 0 or an integer of 1 or more and are not particularly limited as long as the sum of a, b, c and d is 1 or more. Preferably, a, b, c and d are each independently an integer of 0 or more and 200 or less, for example an integer of 1 or more and 200 or less, more preferably each independently an integer of 0 or more and 100 or less, for example, an integer of 1 or more and 100 or less. More preferably, the sum of a, b, c and d is 10 or more, preferably 20 or more, and 200 or less, preferably 100 or less. The occurrence order of the respective repeating units in parentheses with the subscript a, b, c or d is not limited in the formula. Among these repeating units, the —(OC$_4$F$_8$)— group may be any of —(OCF$_2$CF$_2$CF$_2$CF$_2$)—, —(OCF(CF$_3$)CF$_2$CF$_2$)—, —(OCF$_2$CF(CF$_3$) CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$) CF(CF$_3$))—, —(OCF(C$_2$F$_5$)CF$_2$)— and —(OCF$_2$CF (C$_2$F$_5$))—, preferably —(OCF$_2$CF$_2$CF$_2$CF$_2$)—. The —(OC$_3$F$_6$)— group may be any of —(OCF$_2$CF$_2$CF$_2$)—, —(OCF(CF$_3$)CF$_2$)— and —(OCF$_2$CF(CF$_3$))—, preferably —(OCF$_2$CF$_2$CF$_2$)—. The —(OC$_2$F$_4$)— group may be any of —(OCF$_2$CF$_2$)— and —(OCF(CF$_3$))—, preferably —(OCF$_2$CF$_2$)—.

In one embodiment, PFPE is —(OC$_3$F$_6$)$_b$— wherein b is an integer of 1 or more and 200 or less, preferably 10 or more and 100 or less, preferably —(OCF$_2$CF$_2$CF$_2$)$_b$— wherein b is as defined above.

In another embodiment, PFPE is —(OC$_4$F$_8$)$_a$—(OC$_3$F$_6$)$_b$—(OC$_2$F$_4$)$_c$—(OCF$_2$)$_d$— wherein a and b are each independently an integer of 0 or more, or 1 or more and 30 or less, preferably 0 or more and 10 or less, and c and d are each independently an integer of 1 or more and 200 or less, preferably 10 or more and 100 or less. The sum of a, b, c and d is 10 or more, preferably 20 or more and 200 or less, preferably 100 or less. The occurrence order of the respective repeating units in parentheses with the subscript a, b, c or d is not limited in the formula. Preferably, PFPE is —(OCF$_2$CF$_2$CF$_2$CF$_2$)$_a$—(OCF$_2$CF$_2$CF$_2$)$_b$—(OCF$_2$CF$_2$)$_c$—(OCF$_2$)$_d$— wherein a, b, c and d are as defined above. For example, PFPE may be —(OCF$_2$CF$_2$)$_c$—(OCF$_2$)$_d$— wherein c and d are as defined above.

In another embodiment, PFPE is —(OC$_2$F$_4$—R$^3$)$_i$— wherein R$^3$ is each independently at each occurrence a group selected from OC$_2$F$_4$, OC$_3$F$_6$ and OC$_4$F$_8$, or a combination of 2 or 3 groups independently selected from these groups, and i is an integer of 2-100, preferably an integer of 2-50.

Examples of the combination of 2 or 3 groups independently selected from OC$_2$F$_4$, OC$_3$F$_6$ and OC$_4$F$_8$ in R$^3$ include, but not particularly limited to, for example, —OC$_2$F$_4$OC$_3$F$_6$—, —OC$_2$F$_4$OC$_4$F$_8$—, —OC$_3$F$_6$OC$_2$F$_4$—, —OC$_3$F$_6$OC$_3$F$_6$—, —OC$_3$F$_6$OC$_4$F$_8$—, —OC$_4$F$_8$OC$_4$F$_8$—, —OC$_4$F$_8$OC$_3$F$_6$—, —OC$_4$F$_8$OC$_2$F$_4$—, —OC$_2$F$_4$OC$_2$F$_4$OC$_3$F$_6$—, —OC$_2$F$_4$OC$_2$F$_4$OC$_4$F$_8$—, —OC$_2$F$_4$OC$_3$F$_6$OC$_2$F$_4$—, —OC$_2$F$_4$OC$_3$F$_6$OC$_3$F$_6$—, —OC$_2$F$_4$OC$_4$F$_8$OC$_2$F$_4$—, —OC$_3$F$_6$OC$_2$F$_4$OC$_2$F$_4$—, —OC$_3$, F$_6$OC$_2$F$_4$OC$_3$F$_6$—, —OC$_3$F$_6$OC$_3$F$_6$OC$_2$F$_4$—, and —OC$_4$F$_8$OC$_2$F$_4$OC$_2$F$_4$—. In the above formula, OC$_2$F$_4$, OC$_3$F$_6$ and OC$_4$F$_8$ may be straight or branched, preferably straight. In this embodiment, PFPE is preferably —(OC$_2$F$_4$—OC$_3$F$_6$)$_i$— or —(OC$_2$F$_4$—OC$_4$F$_8$)$_i$—.

An average molecular weight of the PFPE moiety described above is, but not particularly limited to, 500-30,000, preferably 1,500-30,000, more preferably 2,000-10,000. It is noted that the "average molecular weight" in the present invention means a number average molecular weight, and the "average molecular weight" is defined as a value measured by using $^{19}$F-NMR.

In the formulae (A1) and (A2), $X^3$ is each independently a single bond or a 2-10 valent organic group. The $X^3$ group is recognized to be a linker which connects between a perfluoropolyether moiety (an Rf-PFPE moiety or -PFPE-moiety) providing mainly water-repellency, surface slip property and the like and a group (specifically, the A group or a group containing the A group) providing an ability to bind to diamond-like carbon layer in the compound of the formula (A1) and (A2). Therefore, the $X^3$ group may be any organic group as long as the compound of the formula (A1) and (A2) can stably exist.

In the formula, α is an integer of 1-9, and α' is an integer of 1-9. α and α' are determined depending on the valence number of the $X^3$ group. In the formula (A1), the sum of α and α' is the valence number of the $X^3$ group. For example, when $X^3$ is a 10 valent organic group, the sum of a and α' is 10, for example, a is 9 and a' is 1, α is 5 and α' is 5, or α is 1 and a' is 9. When $X^3$ is a divalent organic group, α and α' are 1. In the formula (A2), α is a value obtained by subtracting 1 from the valence number of the $X^3$ group.

$X^3$ is preferably a 2-7 valent, more preferably 2-4 valent, more preferably a divalent organic group.

Examples of $X^3$ include, but are not particularly limited to, for example a divalent group of the following formula:

$$-(R^{31})_{p'}-(X^a)_{q'}-R^{32}-$$

wherein:
$R^{31}$ is a single bond, –(CH$_2$)$_{s'}$— or an o-, m- or p-phenylene group, preferably —(CH$_2$)$_{s'}$—,
$R^{32}$ is a single bond, —(CH$_2$)$_{t'}$—, or an o-, m- or p-phenylene group, preferably —(CH$_2$)$_{t'}$—,
s' is an integer of 1-20, preferably an integer of 1-6, more preferably an integer of 1-3, further more preferably 1 or 2,
t' is an integer of 1-20, preferably an integer of 1-6, more preferably an integer of 1-3,
$X^a$ is —(X$^b$)$_{r'}$—,
$X^b$ is each independently at each occurrence a group selected from the group consisting of —O—, —S—, an o-, m- or p-phenylene group, —NR$^{34}$—, and —(CH$_2$)$_{n'}$—,
$R^{34}$ is each independently at each occurrence a hydrogen atom, a phenyl group or a C$_{1-6}$ alkyl group (preferably a methyl group),
n' is each independently at each occurrence an integer of 1-20, preferably an integer of 1-6, more preferably an integer of 1-3,
r' is an integer of 1-10, preferably an integer of 1-5, more preferably an integer of 1-3,
p' is 0 or 1, and
q' is 0 or 1.

Preferably, $X^3$ may be a C$_{1-20}$ alkylene group, or
—R$^{31}$—X$^c$—R$^{32}$—
wherein R$^{31}$ and R$^{32}$ are as defined above.
More preferably, $X^3$ may be,
a C$_{1-20}$ alkylene group,
—(CH$_2$)$_{s'}$—X$^c$—, or
—(CH$_2$)$_{s'}$—X$^c$—(CH$_2$)$_{t'}$—
wherein s' and t' are as defined above.
In the above formula, $X^c$ is —O—.
More preferably, $X^3$ may be,
a C$_{1-20}$ alkylene group, or
—(CH$_2$)$_{s'}$—X$^c$—(CH$_2$)$_{t'}$—
wherein s' and t' are as defined above.
Further preferably, $X^3$ may be,
a C$_{1-20}$ alkylene group, or
—(CH$_2$)$_{s'}$—O—(CH$_2$)$_{t'}$—
wherein each symbol is as defined above.

The $X^3$ group may be substituted by one or more substituents selected from a fluorine atom, a C$_{1-3}$ alkyl group and a C$_{1-3}$ fluoroalkyl group (preferably, a C$_{1-3}$ perfluoroalkyl group).

Specific examples of $X^3$ include, for example:
—CH$_2$OCH$_2$—,
—CH$_2$O(CH$_2$)$_2$—,
—CH$_2$O(CH$_2$)$_3$—,
—CH$_2$O(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—
—CH$_2$—,
—(CH$_2$)$_2$—,
—(CH$_2$)$_3$—,
—(CH$_2$)$_4$—, and
—(CH$_2$)$_6$—.

A number average molecular weight of the compound of formulae (A1) and (A2) is not particularly limited, but may be, for example, 1,000-40,000, preferably 2,000-32,000, more preferably 2,000-20,000, further preferably 2,500-12,000.

The compound of the formulae (A1) and (A2) can be obtained, for example, by introducing a hydroxyl group into a terminal of a perfluoropolyether derivative corresponding to the Rf-PFPE-moiety as a raw material, and subjecting it to Williamson reaction with a compound having a group corresponding to the —Y-A moiety, for example, a compound having a halogenated alkyl group at the terminal.

Alternatively, the compound can be produced by synthesizing a compound having a precursor group corresponding to the Y-A moiety, and converting the precursor to the Y-A moiety by using a method known in the art.

Formulae (B1) and (B2):

  (B1)

  (B2)

In the formulae (B1) and (B2), Y and A are defined as that for the formulae (A1) and (A2).

In the formula, $X^6$ is each independently a single bond or a 2-10 valent organic group. The $X^6$ group is recognized to be a linker which connects between a perfluoropolyether moiety (an $R^{91}$—Rf'— or —Rf'—) providing mainly water-repellency and the like and a group (specifically, the A group or a group containing the A group) providing an ability to bind to a base material in the compound of the formula (B1) and (B2). Therefore, the $X^6$ group may be any organic group as long as the compound of the formula (B1) and (B2) can stably exist.

In the formula, β is an integer of 1-9, and β' is an integer of 1-9. β and β' are determined depending on the valence number of the $X^6$ group. In the formula (B1), the sum of β and β' is the valence number of the $X^6$ group. For example, when $X^6$ is a 10 valent organic group, the sum of β and β' is 10, for example, β is 9 and β' is 1, β is 5 and β' is 5, or β is 1 and β' is 9. When $X^6$ is a divalent organic group, β and β' are 1. In the formula (B2), β is a value obtained by subtracting 1 from the valence number of the $X^6$ group.

$X^6$ is preferably a 2-7 valent, more preferably 2-4 valent, more preferably a divalent organic group.

Examples of $X^6$ include, but are not particularly limited to, the same group as that for $X^3$.

In the formula, $R^{91}$ is a fluorine atom, —$CHF_2$ or —$CF_3$, preferably a fluorine atom or —$CF_3$.

Rf' is a perfluoroalkylene group having 1-20 carbon atoms. Rf' has preferably 1-12 carbon atoms, more preferably 1-6 carbon atoms, further preferably 3-6 carbon atoms. Examples of the specific Rf' include —$CF_2$—, —$CF_2CF_2$—, —$CF_2CF_2CF_2$—, —$CF(CF_3)$—, —$CF_2CF_2CF_2CF_2$—, —$CF_2CF(CF_3)$—, —$C(CF_3)_2$—, —$(CF_2)_4CF_2$—, —$(CF_2)_2CF(CF_3)$—, —$CF_2C(CF_3)_2$—, —$CF(CF_3)CF_2CF_2CF_2$—, —$(CF_2)_5CF_2$—, —$(CF_2)_3CF(CF_3)$—, —$(CF_2)_4CF(CF_3)$—, —$C_8F_{17}$. Among them, a straight perfluoroalkylene having 3-6 carbon atoms, for example, —$CF_2CF_2CF_2CF_2$—, —$CF_2CF_2CF_2$—, etc.

The compound of the formulae (B1) and (B2) can be obtained, for example, by introducing a hydroxyl group into a terminal of a fluoroalkyl derivative corresponding to the $R^{91}$—Rf'— moiety as a raw material, and subjecting it to Williamson reaction with a compound having a group corresponding to the —Y-A moiety, for example, a compound having a halogenated alkyl group at the terminal.

Alternatively, the compound can be produced by synthesizing a compound having a precursor group corresponding to the Y-A moiety, and converting the precursor to the Y-A moiety by using a method known in the art.

In a preferably embodiment, the fluorine-containing compound is one or more compounds of formula (A1) and formula (A2). More preferably, the fluorine-containing compound is one or more compounds of formula (A1).

In another preferably embodiment, the fluorine-containing compound is one or more compounds of formula (B1) and formula (B2). More preferably, the fluorine-containing compound is one or more compounds of formula (B1).

The surface treating agent for forming the antifouling coating layer may be diluted with a solvent. Examples of the solvent include, but are not particularly limited to, for example, a solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane (ZEORORA H (trade name), etc.) $C_4F_9OCH_3$, $C_4F_9OC_2H_5$, $CF_3CH_2OCF_2CHF_2$, $C_6F_{13}CH{=}CH_2$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid and $CF_3O(CF_2CF_2O)_m(CF_2O)_nCF_2CF_3$ [wherein m and n are each independently an integer of 0 or more and 1000 or less, the occurrence order of the respective repeating units in parentheses with the subscript m or n is not limited in the formula, with the proviso that the sum of m and n is 1 or more.], 1,1-dichloro-2,3,3,3-tetrafluoro-1-propene, 1,2-dichloro-1,3,3,3-tetrafluoro-1-propene, 1,2-dichloro-3,3,3-trichloro-1-propene, 1,1-dichloro-3,3,3-trichloro-1-propene, 1,1,2-trichloro-3,3,3-trichloro-1-propene, 1,1,1,4,4,4-hexafluoro-2-butene. These solvents may be used alone or as a mixture of 2 or more compound.

The surface treating agent for forming the antifouling coating layer may comprise other components in addition to the fluorine-containing compound. Examples of the other components include, but are not particularly limited to, for example, a (non-reactive) fluoropolyether compound which may be also understood as a fluorine-containing oil, preferably a perfluoro(poly)ether compound (hereinafter, referred to as "the fluorine-containing oil"), a (non-reactive) silicone compound which may be also understood as a silicone oil (hereinafter referred to as "a silicone oil"), a catalyst, and the like.

Examples of the above-mentioned fluorine-containing oil include, but are not particularly limited to, for example, a compound of the following general formula (3) (a perfluoro (poly)ether compound).

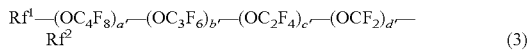

(3)

In the formula, $Rf^1$ represents a $C_{1-16}$ alkyl group which may be substituted by one or more fluorine atoms (preferably, a $C_{1-16}$ perfluoroalkyl group), $Rf^2$ represents a $C_{1-16}$ alkyl group which may be substituted by one or more fluorine atoms (preferably, a $C_{1-16}$ perfluoroalkyl group), a fluorine atom or a hydrogen atom, and more preferably, $Rf^1$ and $Rf^2$ is each independently a $C_{1-3}$ perfluoroalkyl group.

Subscripts a', b', c' and d' represent the repeating number of each of four repeating units of perfluoropolyether which constitute a main backbone of the polymer, and are each independently an integer of 0 or more and 300 or less, and the sum of a', b', c' and d' is at least 1, preferably 1-300, more preferably 20-300. The occurrence order of the respective repeating units in parentheses with the subscript a', b', c' or d' is not limited in the formulae. Among these repeating units, the —$(OC_4F_8)$— group may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, preferably —$(OCF_2CF_2CF_2CF_2)$. The —$(OC_3F_6)$— group may be any of —$(OCF_2CF_2CF_2)$—, —$(OCF(CF_3)CF_2)$— and —$(OCF_2CF(CF_3))$—, preferably —$(OCF_2CF_2CF_2)$—. The —$(OC_2F_4)$— group may be any of —$(OCF_2CF_2)$— and —$(OCF(CF_3))$—, preferably —$(OCF_2CF_2)$—.

Examples of the perfluoropolyether compound of the above general formula (3) include a compound of any of the following general formulae (3a) and (3b) (may be one compound or a mixture of two or more compounds).

(3a)

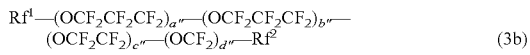

(3b)

In these formulae:

$Rf^1$ and $Rf^2$ are as defined above; in the formula (3a), b" is an integer of 1 or more and 100 or less; and in the formula (3b), a" and b" are each independently an integer of 1 or more and 30 or less, and c" and d" are each independently an integer of 1 or more and 300 or less. The occurrence order of the respective repeating units in parentheses with the subscript a", b", c" or d" is not limited in the formulae.

The above-mentioned fluorine-containing oil may have an average molecular weight of 1,000-30,000. By having such average molecular weight, high surface slip property can be obtained.

The fluorine-containing oil may be contained in the surface-treating agent of the present invention, for example, at 0-500 parts by mass, preferably 0-400 parts by mass, more preferably 5-300 parts by mass with respect to 100 parts by mass of the fluorine-containing compound (as the total mass when two or more compounds are used; hereinafter the same shall apply).

The compound of the general formula (3a) and the compound of the general formula (3b) may be used alone or in combination. The compound of the general formula (3b) is preferable than the compound of the general formula (3a) since the compound of the general formula (3b) provides higher surface slip property than the compound of the general formula (3a). When they are used in combination, the ratio by mass of the compound of the general formula (3a) to the compound of the general formula (3b) is preferably 1:1 to 1:30, more preferably 1:1 to 1:10. By applying such ratio by mass, the antifouling coating layer having a good balance of surface slip property and friction durability can be obtained.

In one embodiment, the fluorine-containing oil comprises one or more compounds of the general formula (3b). In such embodiment, the mass ratio of the fluorine-containing compound to the compound of the formula (3b) in the surface-treating agent is preferably 4:1 to 1:4.

In a preferable embodiment, when the antifouling coating layer is formed by using vacuum deposition, an average molecular weight of the fluorine-containing oil may be higher than an average molecular weight of the fluorine-containing compound. By selecting such average molecular weights, more excellent surface slip property and friction durability can be obtained.

From the other point of view, the fluorine-containing oil may be a compound of the general formula $Rf^3$—F wherein $Rf^3$ is a $C_{5-16}$ perfluoroalkyl group. In addition, the fluorine-containing oil may be a chlorotrifluoroethylene oligomer. The compound of $Rf^3$—F or the chlorotrifluoroethylene oligomer is preferable because the compounds have high affinity for the fluorine-containing compound wherein a terminal is a $C_{1-16}$ perfluoroalkyl group.

The fluorine-containing oil contributes to increasing of surface slip property of the antifouling coating layer.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface-treating agent of the present invention, for example, at 0-300 parts by mass, preferably 0-200 parts by mass with respect to 100 parts by mass of the fluorine-containing compound (as the total mass when two or more compounds are used; hereinafter the same shall apply).

The silicone oil contributes to increasing of surface slip property of the antifouling coating layer.

Examples of the above-mentioned catalyst include a transition metal (for example, Ti, Ni, Sn, etc.), and the like.

The catalyst facilitates a reaction between the fluorine-containing compound and the diamond-like carbon layer and facilitates the formation of the antifouling coating layer.

The surface treating agent is impregnated into a porous material, for example, a porous ceramic material, a metal fiber for example that obtained by solidifying a steel wool to obtain a pellet. The pellet can be used, for example, in vacuum deposition.

The antifouling coating layer can be formed by applying the surface treating agent to a surface of the diamond-like carbon layer on the base material, and performing a post-treatment as necessary. The method for applying the surface treating agent is not particularly limited. For example, a wet coating method or a dry coating method can be used.

Examples of the wet coating method include dip coating, spin coating, flow coating, spray coating, roll coating, gravure coating, and a similar method.

Examples of the dry coating method include deposition (usually, vacuum deposition), sputtering, CVD and a similar method. The specific examples of the deposition method (usually, vacuum deposition) include resistance heating, electron beam, high-frequency heating using microwave, etc., ion beam, and a similar method. The specific examples of the CVD method include plasma-CVD, optical CVD, thermal CVD and a similar method. The deposition method is will be described below in more detail.

Additionally, coating can be performed by an atmospheric pressure plasma method.

When the wet coating method is used, the surface-treating agent is diluted with a solvent, and then it is applied to the surface of the base material. In view of stability of the surface-treating agent and volatile property of the solvent, the following solvents are preferably used: a $C_{5-12}$ aliphatic perfluorohydrocarbon (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon (for example, $C_6F_{13}CH_2CH_3$ (for example, ASAHIKLIN® AC-6000 manufactured by Asahi Glass Co., Ltd.), 1,1,2,2,3,3,4-heptafluorocyclopentane (for example, ZEORORA® H manufactured by Nippon Zeon Co., Ltd.); hydrofluorocarbon (HFC) (for example, 1,1,1,3,3-pentafluorobutane (HFC-365mfc)); hydrochlorofluorocarbon (for example, HCFC-225 (ASAHIKLIN® AK225)); a hydrofluoroether (HFE) (for example, an alkyl perfluoroalkyl ether such as perfluoropropyl methyl ether ($C_3F_7OCH_3$) (for example, Novec™ 7000 manufactured by Sumitomo 3M Ltd.), perfluorobutyl methyl ether ($C_4F_9OCH_3$) (for example, Novec™ 7100 manufactured by Sumitomo 3M Ltd.), perfluorobutyl ethyl ether ($C_4F_9OC_2H_5$) (for example, Novec™ 7200 manufactured by Sumitomo 3M Ltd.), and perfluorohexyl methyl ether ($C_2F_5CF(OCH_3)C_3F_7$) (for example, Novec™ 7300 manufactured by Sumitomo 3M Ltd.) (the perfluoroalkyl group and the alkyl group may be liner or branched)), or $CF_3CH_2OCF_2CHF_2$ (for example, ASAHIKLIN® AE-3000 manufactured by Asahi Glass Co., Ltd.), 1,2-dichloro-1,3,3,3-tetrafluoro-1-propene (for example, VERTREL® Sion manufactured by Du Pont-Mitsui Fluorochemicals Co., Ltd.) and the like. These solvents may be used alone or as a mixture of 2 or more compound. Among them, the hydrofluoroether is preferable, perfluorobutyl methyl ether ($C_4F_9OCH_3$) and/or perfluorobutyl ethyl ether ($C_4F_9OC_2H_5$) are particularly preferable. Furthermore, the solvent can be mixed with another solvent, for example, to adjust solubility of a perfluoro(poly)ether group-containing silane compound (i) and a perfluoro(poly)ether group-containing silane compound (ii) (and further an amine compound (iii), if present).

When the dry coating method is used, the surface-treating agent may be directly subjected to the dry coating method, or may be diluted with a solvent, and then subjected to the dry coating method. For example, the surface-treating agent is used itself in deposition (usually, vacuum deposition), or pellets may be used in the deposition (usually, the vacuum deposition), wherein the pellets is obtained by impregnating a porous metal such as iron or copper or a porous ceramics with the surface-treating agent of the present invention to which the catalyst has been added.

Examples of the post-treatment described above include, for example, a heat treatment. A temperature in the heat treatment is not particularly limited, but may be, for example, 60-250° C., preferably 100° C.-180° C. The teat treatment time is not particularly limited, but may be, for example, 30 minutes to 5 hours, preferably 1-3 hours.

The thickness of the antifouling coating layer is not specifically limited. For the optical member, the thickness of the antifouling coating layer is within the range of 1-50 nm, 1-30 nm, preferably 1-15 nm, in view of optical performance, surface slip property, friction durability and antifouling property.

As described above, the antifouling coating layer (a surface-treating layer) is formed on the surface of the diamond-like carbon layer by using the surface treating agent to prepare the antifouling article of the present invention.

In the antifouling article of the present invention, the bonds between the diamond-like carbon layer and the fluorine-containing compound constituting the antifouling coating layer are formed by the reaction of a part having the $sp^2$ hybridized orbital of the diamond-like carbon layer with the A group of the fluorine-containing compound. Thus, the binding between the diamond-like carbon layer and the fluorine-containing compound by a bond other than a —Si—O—Si— bond, for example, a —C—O— bond, a —C—N— bond, a —C—S— bond, or the like but not the —Si—O—Si— bond sensitive to a hydrolysis reaction, can be achieved. As a result, the antifouling coating layer having excellent acid resistant and alkaline resistant can be obtained. This antifouling coating layer may have water-repellency, oil-repellency, antifouling property (for example, preventing from adhering a fouling such as fingerprints), surface slip property (or lubricity, for example, wiping property of a fouling such as fingerprints and excellent tactile feeling in a finger), and the like depending on a composition of the surface-treating agent, in addition to excellent acid resistant and alkaline resistant, thus may be suitably used as a functional thin film.

In a preferable embodiment, the antifouling article of the present invention may be an optical member. Examples of the optical member include the followings: lens of glasses, or the like; a front surface protective plate, an antireflection plate, a polarizing plate, or an anti-glare plate on displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display); a touch panel sheet of an instrument such as a mobile phone or a personal digital assistance; a disk surface of an optical disk such as a Blu-ray disk, a DVD disk, a CD-R or MO; an optical fiber; and the like.

The antifouling article of the present invention may be also a medical equipment or a medical material.

Hereinbefore, the article produced by using the surface-treating agent of the present invention is described in detail. It is noted that an application, a method for using or a method for producing the article are not limited to the above exemplification.

EXAMPLES

Example 1

The diamond-like carbon layer was formed on a chemical strengthening glass (Gorilla glass manufactured by Corning Incorporated; thickness: 0.7 mm) by using methane as a raw material gas in a plasma CVD apparatus. Subsequently, 0.4 mg of an amino group-containing perfluoropoyether compound (A) having the following average composition per one plate of the chemical strengthening glass (55 mm×100 mm) was vacuum-deposited on the diamond-like carbon layer by resistance heating in a vacuum deposition apparatus. Then, the extra surface-treating agent remaining on the treated surface was removed with ethanol to obtain the antifouling coating layer.

Amino group-containing perfluoropoyether compound (A)

Example 2

The antifouling coating layer was formed similarly to Example 1 except that phosphoric group-containing perfluoropoyether compound (B) having the following average composition was used in place of compound (A).

Phosphoric group-containing perfluoropoyether compound (B)

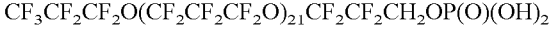

Comparative Example 1

A silicon dioxide film was formed on a chemical strengthening glass (Gorilla glass manufactured by Corning Incorporated; thickness: 0.7 mm) by an electron beam evaporation method and 0.4 mg of silane group-containing perfluoropoyether compound (C) having the following average composition per one plate of the chemical strengthening glass (55 mm×100 mm) was vacuum-deposited on the silicon dioxide film by resistance heating. Then, the extra surface-treating agent remaining on the treated surface was removed with ethanol to obtain the antifouling coating layer.

Silane group-containing perfluoropoyether compound (C)

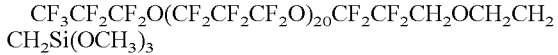

Comparative Example 2

A silicon dioxide film was formed on a chemical strengthening glass (Gorilla glass manufactured by Corning Incorporated; thickness: 0.7 mm) by an electron beam evaporation method and 0.4 mg of the following amino propyl triethoxysilane (D) per one plate of the chemical strengthening glass (55 mm×100 mm) was vacuum-deposited on the silicon dioxide film by resistance heating, and further 0.4 mg of silane group-containing perfluoropoyether compound (C) per one plate of the chemical strengthening glass (55 mm×100 mm) was deposited. Then, the extra surface-treating agent remaining on the treated surface was removed with ethanol to obtain the antifouling coating layer.

Amino propyl triethoxysilane (D)
NH$_2$CH$_2$CH$_2$CH$_2$Si(OC$_2$H$_5$)$_3$

Evaluation of Artificial Perspiration Resistant

For the antifouling coating layers formed on the diamond-like carbon layer in Examples 1 and 2 and Comparative Examples 1 and 2, artificial perspiration resistant was evaluated. Specifically, the base materials on which the antifouling coating layer was formed were immersed in an artificial perspiration having the following composition. The base materials were pulled out of the artificial perspiration for every 48 hours, 168 hours, 504 hours, and 840 hours at 60° C., and the surfaces were washed with distilled water and ethanol. Then, the static water contact angle (degree) was measured. The evaluation was stopped when the measured value of the contact angle became to be less than 100 degree. The results are shown in Table 3 (in the table, symbol "-" means "not measured").

Composition of Artificial Perspiration
Disodium hydrogen phosphate anhydrous: 2 g
Sodium chloride: 20 g
85% lactic acid: 2 g
Histidine hydrochloride: 5 g
Distilled water: 1 kg

TABLE 1

| Immersion time (hour) | Contact angle (degree) | | | |
|---|---|---|---|---|
| | Example 1 | Example 2 | Comparative Example 1 | Comparative Example 2 |
| 0 | 113 | 115 | 114 | 113 |
| 48 | 112 | 111 | 109 | 110 |
| 168 | 112 | 111 | 100 | 106 |
| 504 | 112 | 109 | 88 | 101 |
| 840 | 111 | 108 | — | 96 |

As understood from Table 1, it was confirmed that the antifouling coating layer of Examples 1 and 2 had excellent perspiration resistant. The reason for this is considered that the function is maintained since the bond between the diamond-like carbon layer on the surface of the base material and the fluorine-containing compound is not likely to be affected by an alkaline environment. On the other hand, in Comparative Examples 1 and 2, the bond between the diamond-like carbon layer and the fluorine-containing compound (C) is sensitive to a hydrolysis reaction under the alkaline environment of artificial perspiration since the bond is a Si—O—Si bond.

INDUSTRIAL APPLICABILITY

The present invention can be suitably used for forming the surface-treating layer on a surface of various base materials, in particular an optical member.

The present invention includes following embodiments:

Embodiment 1

An antifouling article comprising a base material, a diamond-like carbon layer and an antifouling coating layer which is formed on the diamond-like carbon layer from a surface treating agent comprising a perfluoropolyether group-containing compound or a perfluoroalkyl group-containing compound.

Embodiment 2

The antifouling article according to Embodiment 1 comprising a base material, a diamond-like carbon layer and an antifouling coating layer which is formed on the diamond-like carbon layer from a surface treating agent comprising one or more fluorine-containing compounds of any of formulae (A1), (A2), (B1) and (B2):

wherein:
A is each independently at each occurrence —OH, —SH, —COOH, —COSH, —CONH$_2$, —P(O)(OH)$_2$, —OP(O)(OH)$_2$, —NR$^1$$_2$,

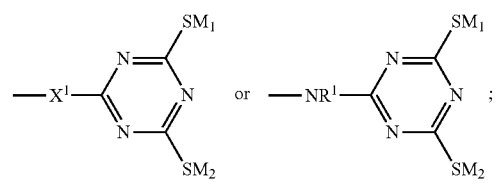

R$^1$ is each independently a hydrogen atom or a lower alkyl group;
X$^1$ is O or S;
M$_1$ and M$_2$ are each independently a hydrogen atom or an alkali metal;
Y is each independently at each occurrence a single bond or a divalent organic group;
Rf is each independently an alkyl group having 1-16 carbon atoms which may be substituted by one or more fluorine atoms;
PFPE is each independently —(OC$_4$F$_8$)$_a$—(OC$_3$F$_6$)$_b$—(OC$_2$F$_4$)$_c$—(OCF$_2$)$_d$—,
wherein a, b, c and d are each independently an integer of 0 or more and 200 or less, the sum of a, b, c and d is 1 or more, and the occurrence order of the respective repeating units in parentheses with the subscript a, b, c or d is not limited in the formula;
X$^3$ is each independently a single bond or a 2-10 valent organic group;
α is each independently an integer of 1-9;
α' is each independently an integer of 1-9;
X$^6$ is each independently a single bond or a 2-10 valent organic group;
β is each independently an integer of 1-9;
β' is each independently an integer of 1-9;
R$^{91}$ is a fluorine atom, —CHF$_2$ or —CF$_3$; and
Rf' is a perfluoroalkylene group having 1-20 carbon atoms.

Embodiment 3

The antifouling article according to Embodiment 2 wherein A is —SH, —P(O)(OH)$_2$, —OP(O)(OH)$_2$, —NR$^1$$_2$, or

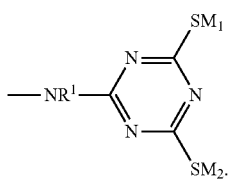

Embodiment 4

The antifouling article according to Embodiment 2 or 3 wherein Rf is a perfluoroalkyl group having 1-16 carbon atoms.

Embodiment 5

The antifouling article according to any one of Embodiments 2-4 wherein PFPE is following formula (a) or (b):
(a) —(OC$_3$F$_6$)$_b$—
in formula (a), b is an integer of one or more and 200 or less;
(b) —(OC$_4$F$_8$)$_a$—(OC$_3$F$_6$)$_b$—(OC$_2$F$_4$)$_c$—(OCF$_2$)$_d$—
in formula (b), a and b are each independently an integer of 0 or more and 30 or less, c and d are each independently an integer of one or more and 200 or less, the sum of a, b, c and d is an integer of 10 or more and 200 or less, and the occurrence order of the respective repeating units in parentheses with the subscript a, b, c or d is not limited in the formula.

Embodiment 6

The antifouling article according to any one of Embodiments 2-5 wherein in PFPE:
—(OC$_4$F$_8$)$_a$— is —(OCF$_2$CF$_2$CF$_2$CF$_2$)$_a$—,
—(OC$_3$F$_6$)$_b$— is —(OCF$_2$CF$_2$CF$_2$)$_b$—, and
—(OC$_2$F$_4$)$_c$— is —(OCF$_2$CF$_2$)$_c$—.

Embodiment 7

The antifouling article according to any one of Embodiments 2-6 wherein X$^3$ and X$^6$ are a divalent organic group, α and β are 1, and α' and β' are 1.

Embodiment 8

The antifouling article according to any one of Embodiments 2-7 wherein X$^3$ and X$^6$ are each independently a group of —(R$^{31}$)$_{p'}$—(X$^a$)$_{q'}$—12$^{32}$—
wherein:
R$^{31}$ is a single bond, —(CH$_2$)$_{s'}$— (wherein s' is an integer of 1-20) or an o-, m- or p-phenylene group;
R$^{32}$ is a single bond, —(CH$_2$)$_{t'}$— (wherein t' is an integer of 1-20) or an o-, m- or p-phenylene group;
X$^a$ is —(X$^b$)$_{r'}$— (wherein r' is an integer of 1-10);
X$^b$ is each independently at each occurrence a group selected from the group consisting of —O—, —S—, an o-, m- or p-phenylene group, —NR$^{34}$— and —(CH$_2$)$_{n'}$— (wherein n' is an integer of 1-20);
R$^{34}$ is each independently at each occurrence a hydrogen atom, a phenyl group or a C$_{1-6}$ alkyl group;
p' is 0 or 1;
q' is 0 or 1;
the occurrence order of the respective repeating units in parentheses with the subscript p' and q' is not limited in the formula, and
R$^{31}$, R$^{32}$ and X$^a$ may be substituted by one or more substituents selected from a fluorine atom, a C$_{1-3}$ alkyl group and a C$_{1-3}$ fluoroalkyl group.

Embodiment 9

The antifouling article according to any one of Embodiments 2-8 wherein X$^3$ and X$^6$ are each independently selected from the group consisting of:
—CH$_2$OCH$_2$—,
—CH$_2$O(CH$_2$)$_2$—,
—CH$_2$O(CH$_2$)$_3$—,
—CH$_2$O(CH$_2$)$_6$—,
—CH$_2$—,
—(CH$_2$)$_2$—,
—(CH$_2$)$_3$—,
—(CH$_2$)$_4$—, and
—(CH$_2$)$_6$—.

Embodiment 10

The antifouling article according to any one of Embodiments 2-9 wherein R$^{91}$ is a fluorine atom or CF$_3$.

Embodiment 11

The antifouling article according to any one of Embodiments 2-10 wherein the fluorine-containing compound is at least one compound of any of formulae (A1) and (A2).

Embodiment 12

The antifouling article according to any one of Embodiments 2-10 wherein the fluorine-containing compound is at least one compound of any of formulae (B1) and (B2).

Embodiment 13

The antifouling article according to any one of Embodiments 1-12 wherein the surface treating agent further comprises one or more components selected form a fluorine-containing oil, a silicone oil, and a catalyst.

Embodiment 14

The antifouling article according to Embodiment 13 wherein the fluorine-containing oil is one or more compounds of formula (3):

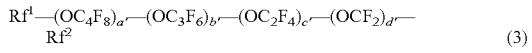

(3)

wherein:
Rf$^1$ is an alkyl group having 1-16 carbon atoms which may be substituted by one or more fluorine atoms;
Rf$^2$ is an alkyl group having 1-16 carbon atoms which may be substituted by one or more fluorine atoms, a fluorine atom or a hydrogen atom;
a', b', c' and d' are the repeating number of each of four repeating units of the perfluoro(poly)ether which constitute a main backbone of the polymer, and are each independently an integer of 0 or more and 300 or less, the sum of a', b', c' and d' is 1 or more, and the occurrence order of the respective repeating units in parentheses with the subscript a', b', c' and d' is not limited in the formula.

Embodiment 15

The antifouling article according to Embodiment 13 or 14 wherein the fluorine-containing oil is one or more compounds of the formula (3a) or (3b):

(3a)

(3b)

wherein:
Rf$^1$ is an alkyl group having 1-16 carbon atoms which may be substituted by one or more fluorine atoms;
Rf$^2$ is an alkyl group having 1-16 carbon atoms which may be substituted by one or more fluorine atoms, a hydrogen atom or a fluorine atom; and
in the formula (3a), b" is an integer of 1 or more and 100 or less;
in the formula (3b), a" and b" are each independently an integer of 0 or more and 30 or less, and c" and d" are each independently an integer of 1 or more and 300 or less; and
the occurrence order of the respective repeating units in parentheses with the subscript a", b", c" or d" is not limited in the formula.

Embodiment 16

The antifouling article according to any one of Embodiments 1-15 wherein the base material is a glass or a sapphire glass.

Embodiment 17

The antifouling article according to Embodiment 16 wherein the glass is a glass selected from the group consisting of a soda-lime glass, an alkali aluminosilicate glass, a borosilicate glass, a non-alkaline glass, a crystal glass and a quartz glass.

Embodiment 18

The antifouling article according to any one of Embodiments 1-17 which is an optical member.

The invention claimed is:
1. An antifouling article comprising a base material, a diamond-like carbon layer and an antifouling coating layer which is formed on the diamond-like carbon layer from a surface treating agent comprising one or more fluorine-containing compounds of any of formulae (A1), (A2), (B1) and (B2):

(A1)

(A2)

(B1)

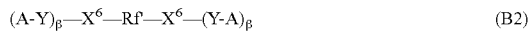

(B2)

wherein:
A is each independently at each occurrence —SH, —COOH, —COSH, —P(O)(OH)$_2$, —OP(O)(OH)$_2$, —NHR$^1$,

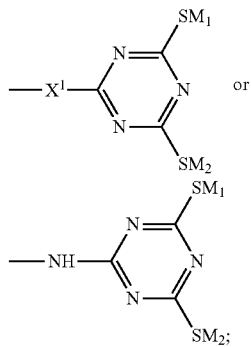

R$^1$ is each independently a hydrogen atom or a lower alkyl group;
X$^1$ is O or S;
M$_1$ and M$_2$ are each independently a hydrogen atom or an alkali metal;
Y is each independently at each occurrence a single bond or a divalent organic group;
Rf is each independently an alkyl group having 1-16 carbon atoms which may be substituted by one or more fluorine atoms;
PFPE is each independently —(OC$_4$F$_8$)$_a$—(OC$_3$F$_6$)$_b$—(OC$_2$F$_4$)$_c$—(OCF$_2$)$_d$—,
wherein a, b, c and d are each independently an integer of 0 or more and 200 or less, the sum of a, b, c and d is 1 or more, and the occurrence order of the respective repeating units in parentheses with the subscript a, b, c or d is not limited in the formula;
X$^3$ is each independently a single bond or a 2-10 valent organic group;
α is each independently an integer of 1-9;
α' is each independently an integer of 1-9;
X$^6$ is each independently a single bond or a 2-10 valent organic group;
β is each independently an integer of 1-9;
β' is each independently an integer of 1-9;
R$^{91}$ is a fluorine atom, —CHF$_2$ or —CF$_3$; and
Rf' is a perfluoroalkylene group having 1-20 carbon atoms.

2. The antifouling article according to claim 1 wherein A is —SH, —P(O)(OH)$_2$, —OP(O)(OH)$_2$, NHR$^1$, or

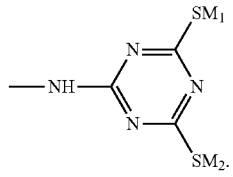

3. The antifouling article according to claim 1 wherein Rf is a perfluoroalkyl group having 1-16 carbon atoms.
4. The antifouling article according to claim 1 wherein PFPE is following formula (a) or (b):
(a) —(OC$_3$F$_6$)$_b$—
in formula (a), b is an integer of one or more and 200 or less;
(b) —(OC$_4$F$_8$)$_a$—(OC$_3$F$_6$)$_b$—(OC$_2$F$_4$)$_c$—(OCF$_2$)$_d$—
in formula (b), a and b are each independently an integer of 0 or more and 30 or less, c and d are each independently an integer of one or more and 200 or less, the sum of a, b, c and d is an integer of 10 or more and 200 or less, and the occurrence order of the respective repeating units in parentheses with the subscript a, b, c or d is not limited in the formula.

5. The antifouling article according to claim 1 wherein in PFPE:
—$(OC_4F_8)_a$— is —$(OCF_2CF_2CF_2CF_2)_a$—,
—$(OC_3F_6)_b$— is —$(OCF_2CF_2CF_2)_b$—, and
—$(OC_2F_4)_c$— is —$(OCF_2CF_2)_c$—.

6. The antifouling article according to claim 1 wherein $X^3$ and $X^6$ are a divalent organic group, α and β are 1, and α' and β' are 1.

7. The antifouling article according to claim 1 wherein $X^3$ and $X^6$ are each independently a group of —$(R^{31})_{p'}$—$(X^a)_{q'}$—$R^{32}$—
wherein:
$R^{31}$ is a single bond, —$(CH_2)_{s'}$— (wherein s' is an integer of 1-20) or an o-, m- or p-phenylene group;
$R^{32}$ is a single bond, —$(CH_2)_{t'}$— (wherein t' is an integer of 1-20) or an o-, m- or p-phenylene group;
$X^a$ is —$(X^b)_{r'}$— (wherein r' is an integer of 1-10);
$X^b$ is each independently at each occurrence a group selected from the group consisting of —O—, —S—, an o-, m- or p-phenylene group, —$NR^{34}$— and —$(CH_2)_{n'}$— (wherein n' is an integer of 1-20);
$R^{34}$ is each independently at each occurrence a hydrogen atom, a phenyl group or a $C_{1-6}$ alkyl group;
p' is 0 or 1;
q' is 0 or 1;
the occurrence order of the respective repeating units in parentheses with the subscript p' and q' is not limited in the formula, and
$R^{31}$, $R^{32}$ and $X^a$ may be substituted by one or more substituents selected from a fluorine atom, a $C_{1-3}$ alkyl group and a $C_{1-3}$ fluoroalkyl group.

8. The antifouling article according to claim 1 wherein $X^3$ and $X^6$ are each independently selected from the group consisting of:
—$CH_2OCH_2$—,
—$CH_2O(CH_2)_2$—,
—$CH_2O(CH_2)_3$—,
—$CH_2O(CH_2)_6$—,
—$CH_2$—,
—$(CH_2)_2$—,
—$(CH_2)_3$—,
—$(CH_2)_4$—, and
—$(CH_2)_6$—.

9. The antifouling article according to claim 1 wherein $R^{91}$ is a fluorine atom or $CF_3$.

10. The antifouling article according to claim 1 wherein the fluorine-containing compound is at least one compound of any of formulae (A1) and (A2).

11. The antifouling article according to claim 1 wherein the fluorine-containing compound is at least one compound of any of formulae (B1) and (B2).

12. The antifouling article according to claim 1 wherein the surface treating agent further comprises one or more components selected form a fluorine-containing oil, a silicone oil, and a catalyst.

13. The antifouling article according to claim 12 wherein the fluorine-containing oil is one or more compounds of formula (3):

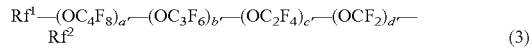
(3)

wherein:
$Rf^1$ is an alkyl group having 1-16 carbon atoms which may be substituted by one or more fluorine atoms;
$Rf^2$ is an alkyl group having 1-16 carbon atoms which may be substituted by one or more fluorine atoms, a fluorine atom or a hydrogen atom;
a', b', c' and d' are the repeating number of each of four repeating units of the perfluoro(poly)ether which constitute a main backbone of the polymer, and are each independently an integer of 0 or more and 300 or less, the sum of a', b', c' and d' is 1 or more, and the occurrence order of the respective repeating units in parentheses with the subscript a', b', c' and d' is not limited in the formula.

14. The antifouling article according to claim 12 wherein the fluorine-containing oil is one or more compounds of the formula (3a) or (3b):

 (3a)

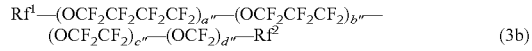 (3b)

wherein:
$Rf^1$ is an alkyl group having 1-16 carbon atoms which may be substituted by one or more fluorine atoms;
$Rf^2$ is an alkyl group having 1-16 carbon atoms which may be substituted by one or more fluorine atoms, a hydrogen atom or a fluorine atom; and
in the formula (3a), b" is an integer of 1 or more and 100 or less;
in the formula (3b), a" and b" are each independently an integer of 0 or more and 30 or less, and c" and d" are each independently an integer of 1 or more and 300 or less; and
the occurrence order of the respective repeating units in parentheses with the subscript a", b", c" or d" is not limited in the formula.

15. The antifouling article according to claim 1 wherein the base material is a glass or a sapphire glass.

16. The antifouling article according to claim 15 wherein the glass is a glass selected from the group consisting of a soda-lime glass, an alkali aluminosilicate glass, a borosilicate glass, a non-alkaline glass, a crystal glass and a quartz glass.

17. The antifouling article according to claim 1 which is an optical member.

\* \* \* \* \*